United States Patent
Boire et al.

(10) Patent No.: US 7,892,661 B2
(45) Date of Patent: Feb. 22, 2011

(54) SUBSTRATE WITH A PHOTOCATALYTIC COATING

(75) Inventors: Philippe Boire, Paris (FR); Xavier Talpaert, Paris (FR)

(73) Assignee: Saint-Gobain Glass France, Paris (FR)

( * ) Notice: Subject to any disclaimer, the term of this patent is extended or adjusted under 35 U.S.C. 154(b) by 64 days.

(21) Appl. No.: 12/177,492

(22) Filed: Jul. 22, 2008

(65) Prior Publication Data

US 2008/0292872 A1    Nov. 27, 2008

Related U.S. Application Data

(63) Continuation of application No. 10/079,483, filed on Feb. 22, 2002, now abandoned, which is a continuation of application No. 10/000,503, filed on Dec. 4, 2001, now abandoned, which is a continuation of application No. 09/615,910, filed on Jul. 13, 2000, now Pat. No. 6,326,079, which is a continuation of application No. 09/029,855, filed as application No. PCT/FR96/01421 on Sep. 13, 1996, now Pat. No. 6,103,363.

(30) Foreign Application Priority Data

| Sep. 15, 1995 | (FR) | .................................. 95 10839 |
| Sep. 13, 2006 | (FR) | ...................... PCT/FR96/01421 |

(51) Int. Cl.
  *B32B 9/00* (2006.01)

(52) U.S. Cl. .................. 428/699; 428/426; 428/428; 428/432; 428/698; 428/697; 428/701; 428/702

(58) Field of Classification Search ............... 428/426, 428/428, 432, 433, 434, 698, 697, 699, 701, 428/702, 704
See application file for complete search history.

(56) References Cited

U.S. PATENT DOCUMENTS

| 5,514,454 A | * | 5/1996 | Boire et al. ............... 428/216 |
| 5,605,609 A | * | 2/1997 | Ando et al. ............ 204/192.23 |
| 6,103,363 A | | 8/2000 | Boire et al. |
| 6,326,079 B1 | | 12/2001 | Philippe et al. |
| 6,680,135 B2 | | 1/2004 | Boire et al. |
| 6,746,775 B1 | | 6/2004 | Boire et al. |
| 6,846,556 B2 | | 1/2005 | Boire et al. |
| 7,074,486 B2 | | 7/2006 | Boire et al. |
| 2002/0028361 A1 | | 3/2002 | Boire et al. |
| 2002/0071956 A1 | | 6/2002 | Boire et al. |
| 2002/0110638 A1 | | 8/2002 | Boire et al. |
| 2002/0119307 A1 | | 8/2002 | Boire et al. |
| 2003/0207028 A1 | | 11/2003 | Boire et al. |
| 2004/0216487 A1 | | 11/2004 | Boire et al. |

* cited by examiner

*Primary Examiner*—Gwendolyn Blackwell
(74) *Attorney, Agent, or Firm*—Oblon, Spivak, McClelland, Maier & Neustadt, L.L.P.

(57) ABSTRACT

The subject of the invention is a glass-, ceramic-vitroceramic based substrate (1) provided on at least part of at least one of its faces with a coating (3) with a photocatalytic property containing at least partially crystalline titanium oxide. It also relates to the applications of such a substrate and to its method of preparation.

13 Claims, 2 Drawing Sheets

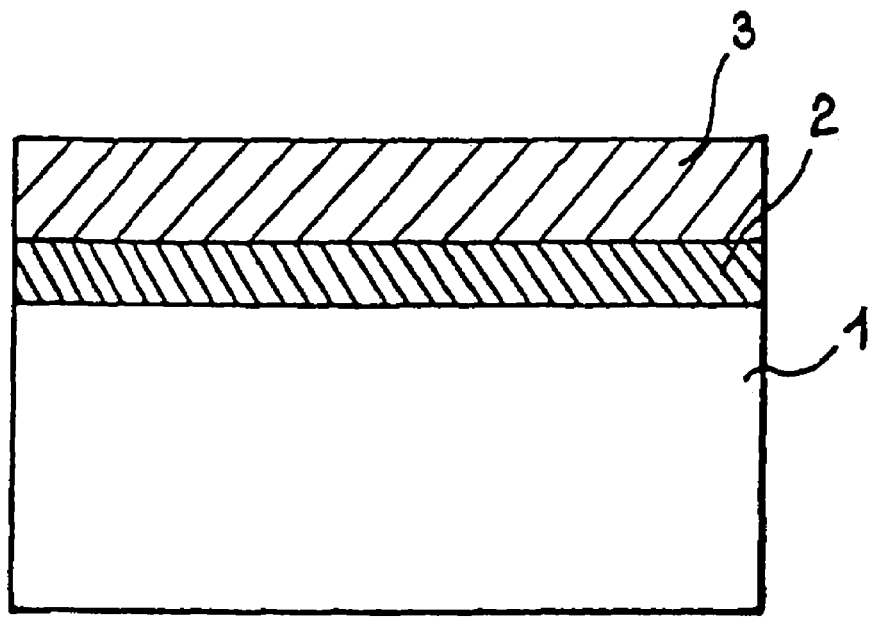
FIG_1
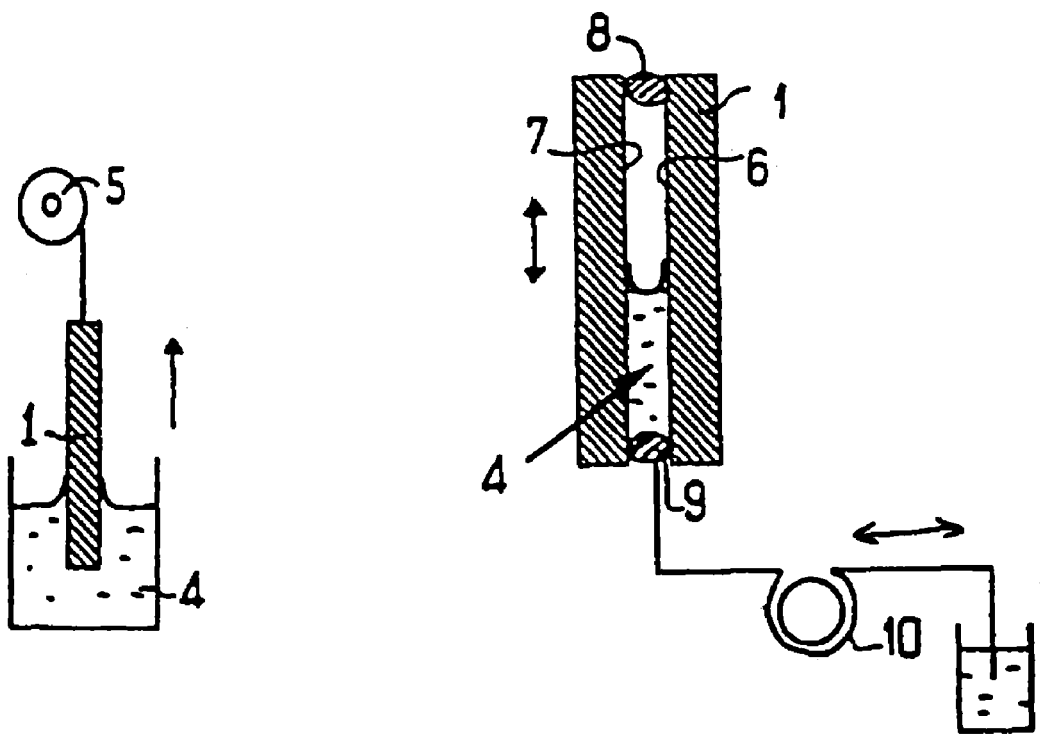
FIG_2 FIG_3

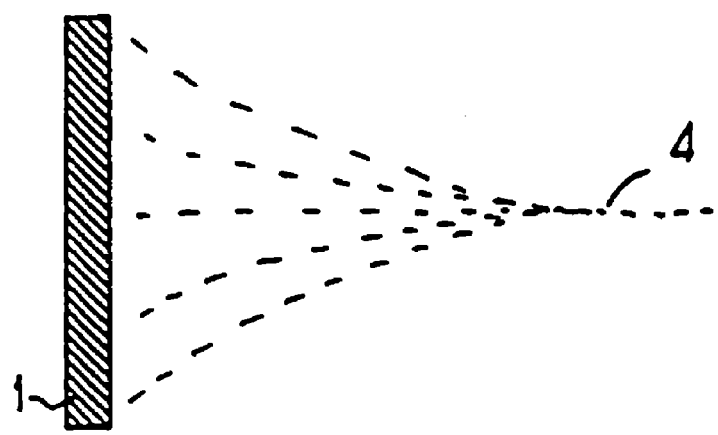
FIG_4
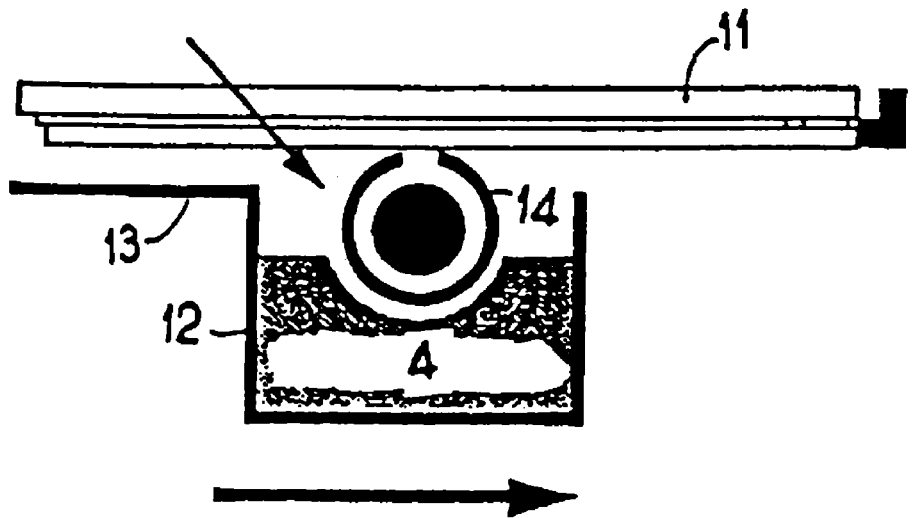
FIG_5

SUBSTRATE WITH A PHOTOCATALYTIC COATING

This application is a Continuation of U.S. application Ser. No. 10/079,483, filed on Feb. 22, 2002, which is a Continuation of U.S. application Ser. No. 10/000,503, filed on Dec. 4, 2001, which is a Continuation of U.S. application Ser. No. 09/615,910, filed on Jul. 13, 2000, which is a Continuation of U.S. application Ser. No. 09/029,855, filed on May 28, 1998, which the National Stage of International No. PCT/FR/96/01421, filed on Sep. 13, 1996.

The invention relates to glass-, ceramic- or vitroceramic-based substrates, more particularly made of glass, in particular transparent substrates, which are furnished with coatings with photocatalytic properties, for the purpose of manufacturing glazing for various applications, such as utilitarian glazing or glazing for vehicles or for buildings.

There is an increasing search to functionalize glazing by depositing at the surface thereof thin layers intended to confer thereon a specific property according to the targeted application. Thus, there exist layers with an optical function, such as so-called anti-glare layers composed of a stack of layers alternatively with high or low refractive indices. For an anti-static function or a heating function of the anti-icer type, it is also possible to provide electrically conducting thin layers, for example based on metal or doped metal oxide. For an anti-solar or low-emissivity thermal function for example, thin layers made of metal of the silver type or based on metal oxide or nitride may be used. To obtain a "rain-repellent" effect, it is possible to provide layers with a hydrophobic nature, for example based on fluorinated organosilane and the like.

However, there still exists a need for a substrate, particularly a glazing, which could be described as "dirt-repellent", that is to say targeted at the permanence over time of the appearance and surface properties, and which makes it possible in particular to render cleaning less frequent and/or to improve the visibility, by succeeding in removing, as they are formed, the dirty marks which are gradually deposited at the surface of a substrate, in particular dirty marks of organic origin, such as finger marks or volatile organic products present in the atmosphere, or even dirty marks of condensation type.

In point of fact, it is known that there exist certain semiconductive materials based on metal oxides which are capable, under the effect of radiation of appropriate wavelength, of initiating radical reactions which cause the oxidation of organic products; they are generally referred to as "photocatalytic" or alternatively "photoreactive" materials.

The aim of the invention is then to develop photocatalytic coatings on a substrate which exhibit a marked "dirt-repellent" effect with respect to the substrate and which can be manufactured industrially.

The object of the invention is a glass-, ceramic- or vitroceramic-based substrate, in particular made of glass and transparent, provided on at least part of at least one of its faces with a coating with a photocatalytic property containing at least partially crystalline titanium oxide. The titanium oxide is preferably crystallized "in situ" during the formation of the coating on the substrate.

Titanium oxide is in fact one of the semi-conductors which, under the effect of light in the visible or ultraviolet range, degrade organic products which are deposited at their surface. The choice of titanium oxide to manufacture a glazing with a "dirt-repellent" effect is thus particularly indicated, all the more so since this oxide exhibits good mechanical strength and good chemical resistance: for long-term effectiveness, it is obviously important for the coating to retain its integrity, even if it is directly exposed to numerous attacks, in particular during the fitting of the glazing on a building site (building) or on a production line (vehicle) which involves repeated handlings by mechanical or pneumatic prehension means, and also once the glazing is in place, with risks of abrasion (windscreen wipers, abrasive rag) and of contact with aggressive chemicals (atmospheric pollutants of $SO_2$ type, cleaning product, and the like).

The choice has fallen, in addition, on a titanium oxide which is at least partially crystalline because it has been shown that it had a much better performance in terms of photocatalytic property than amorphous titanium oxide. It is preferably crystallized in the anatase form, in the rutile form or in the form of a mixture of anatase and rutile, with a degree of crystallization of at least 25%, in particular of approximately 30 to 80%, in particular close to the surface (the property being rather a surface property). (Degree of crystallization is understood to mean the amount by weight of crystalline $TiO_2$ with respect to the total amount by weight of $TiO_2$ in the coating).

It has also been possible to observe, in particular in the case of crystallization in anatase form, that the orientation of the $TiO_2$ crystals growing on the substrate had an effect on the photocatalytic behaviour of the oxide: there exists a favoured orientation (1, 1, 0) which markedly promotes photocatalysis.

The coating is advantageously manufactured so that the crystalline titanium oxide which it contains is in the form of "crystallites", at least close to the surface, that is to say of monocrystals, having an average size of between 0.5 and 100 nm, preferably 1 to 50 nm, in particular 10 to 40 nm, more particularly between 20 and 30 nm. It is in fact in this size range that titanium oxide appears to have an optimum photocatalytic effect, probably because the crystallites of this size develop a high active surface area.

As will be seen in more detail subsequently, it is possible to obtain the coating based on titanium oxide in many of ways:

by decomposition of titanium precursors (pyrolysis techniques: liquid pyrolysis, powder pyrolysis, pyrolysis in the vapour phase, known as CVD (Chemical Vapour Deposition), or techniques associated with the sol-gel: dipping, cell coating, and the like), by a vacuum technique (reactive or non-reactive cathodic sputtering).

The coating can also contain, in addition to the crystalline titanium oxide, at least one other type of inorganic material, in particular in the form of an amorphous or partially crystalline oxide, for example a silicon oxide (or mixture of oxides), titanium oxide, tin oxide, zirconium oxide or aluminium oxide. This inorganic material can also participate in the photocatalytic effect of the crystalline titanium oxide, by itself exhibiting to a certain extent a photocatalytic effect, even a weak effect compared with that of crystalline $TiO_2$, which is the case with tin oxide or amorphous titanium oxide.

A layer of "mixed" oxide thus combining at least partially crystalline titanium oxide with at least one other oxide can be advantageous from an optical viewpoint, very particularly if the other oxide or oxides are chosen with a lower index than that of $TiO_2$: by lowering the "overall" refractive index of the coating, it is possible to vary the light reflection of the substrate provided with the coating, in particular to lower this reflection. This is the case if, for example, a layer made of $TiO_2/Al_2O_3$, a method for the preparation of which is described in Patent EP-0,465,309, or made of $TiO_2/SiO_2$ is chosen. It is necessary, of course, for the coating to contain however a $TiO_2$ content which is sufficient to maintain a significant photocatalytic activity. It is thus considered that it is preferable for the coating to contain at least 40% by weight, in particular at least 50% by weight, of $TiO_2$ with respect to the total weight of oxide(s) in the coating.

It is also possible to choose to superimpose, with the coating according to the invention, a grafted oleophobic and/or hydrophobic layer which is stable or resistant to photocatalysis, for example based on the fluorinated organosilane described in patents U.S. Pat. No. 5,368,892 and U.S. Pat. No. 5,389,427 and on the perfluoroalkylsilane described in Patent Application FR-94/08734 of 13 Jul. 1994, published under the number FR-2,722,493 and corresponding to European Patent EP-0,692,463, in particular of formula:

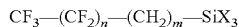

in which n is from 0 to 12, m is from 2 to 5 and X is a hydrolysable group.

To amplify the photocatalytic effect of the titanium oxide of the coating according to the invention, it is possible first of all to increase the absorption band of the coating, by incorporating other particles in the coating, in particular metal particles or particles based on cadmium, tin, tungsten, zinc, cerium or zirconium.

It is also possible to increase the number of charge carriers by doping the crystal lattice of the titanium oxide by inserting therein at least one of the following metal elements: niobium, tantalum, iron, bismuth, cobalt, nickel, copper, ruthenium, cerium or molybdenum.

This doping can also be carried out by surface doping only of the titanium oxide or of the combined coating, surface doping carried out by covering at least part of the coating with a layer of metal oxides or salts, the metal being chosen from iron, copper, ruthenium, cerium, molybdenum, vanadium and bismuth.

Finally, the photocatalytic phenomenon can be accentuated by increasing the yield and/or the kinetics of the photocatalytic reactions, by covering the titanium oxide, or at least part of the coating which incorporates it, with a noble metal in the form of a thin layer of the platinum, rhodium, silver or palladium type.

Such a catalyst, for example deposited by a vacuum technique, in fact makes it possible to increase the number and/or the lifetime of the radical entities created by the titanium oxide and thus to promote the chain reactions leading to the degradation of organic products.

In an entirely surprising way, the coating exhibits in fact not one property but two, as soon as it is exposed to appropriate radiation, as in the visible and/or ultraviolet field, such as sunlight: by the presence of photocatalytic titanium oxide, as already seen, it promotes the gradual disappearance, as they are accumulated, of dirty marks of organic origin, their degradation being caused by a radical oxidation process. Inorganic dirty marks are not, themselves, degraded by this process: they therefore remain on the surface and, except for a degree of crystallization, they are in part easily removed since they no longer have any reason to adhere to the surface, the binding organic agents being degraded by photocatalysis.

However, the coating of the invention, which is permanently self-cleaning, also preferably exhibits an external surface with a pronounced hydrophilic and/or oleophilic nature which results in three very advantageous effects:

a hydrophilic nature makes possible complete wetting of the water which can be deposited on the coating. When a water condensation phenomenon takes place, instead of a deposit of water droplets in the form of condensation which hampers visibility, there is in fact a continuous thin film of water which is formed on the surface of the coating and which is entirely transparent. This "anti-condensation" effect is in particular demonstrated by the measurement of a contact angle with water of less than 5° after exposure to light, and after running of water, in particular of rain, over a surface which has not been treated with a photocatalytic layer, many drops of rainwater remain stuck to the surface and leave, once evaporated, unattractive and troublesome marks, mainly of inorganic origin. Indeed, a surface exposed to the surrounding air is rapidly covered by a layer of dirty marks which limits the wetting thereof by water. These dirty marks are in addition to the other dirty marks, in particular inorganic marks (crystallizations and the like), contributed by the atmosphere in which the glazing bathes. In the case of a photoreactive surface, these inorganic dirty marks are not directly degraded by photocatalysis. In fact, they are in very large part removed by virtue of the hydrophilic nature induced by the photocatalytic activity. This hydrophilic nature indeed causes complete spreading of the drops of rain. Evaporation marks are therefore no longer present. Moreover, the other inorganic dirty marks present on the surface are washed, or redissolved in the case of crystallization, by the water film and are thus in large part removed. An "inorganic dirt-repellent" effect is obtained, induced in particular by rain, in conjunction with a hydrophilic nature, the coating can also exhibit an oleophilic nature which makes possible the "wetting" of the organic dirty marks which, as with water, then tend to be deposited on the coating in the form of a continuous film which is less visible than highly localized "stains". An "organic dirt-repellent" effect is thus obtained which operates in two ways: as soon as it is deposited on the coating, the dirty mark is already not very visible. Subsequently, it gradually disappears by radical degradation initiated by photocatalysis.

The coating can be chosen with a more or less smooth surface. A degree of roughness can indeed be advantageous:

it makes it possible to develop a greater active photocatalytic surface area and thus induces a greater photocatalytic activity, it has a direct effect on the wetting. The roughness in fact enhances the wetting properties. A smooth hydrophilic surface will be even more hydrophilic once rendered rough. "Roughness" is understood to mean, in this instance, both the surface roughness and the roughness induced by a porosity of the layer in at least a portion of its thickness.

The above effects will be all the more marked when the coating is porous and rough, resulting in a superhydrophilic effect for rough photoreactive surfaces. However, when exaggerated, the roughness can be penalizing by promoting incrustation or accumulation of dirty marks and/or by bringing about the appearance of an optically unacceptable level of fuzziness.

It has thus proved to be advantageous to adapt the method for deposition of $TiO_2$-based coatings so that they exhibit a roughness of approximately 2 to 20 nm, preferably of 5 to 15 nm, this roughness being evaluated by atomic force microscopy, by measurement of the value of the root mean square or RMS over a surface area of 1 square micrometre. With such roughnesses, the coatings exhibit a hydrophilic nature which is reflected by a contact angle with water which can be less than 1°. It has also been found that it is advantageous to promote a degree of porosity in the thickness of the coating. Thus, if the coating consists only of $TiO_2$, it preferably exhibits a porosity of the order of 65 to 99%, in particular of 70 to 90%, the porosity being defined in this instance indirectly by the percentage of the theoretical relative density of $TiO_2$, which is approximately 3.8. One means for promoting such a porosity comprises, for example, the deposition of the coating by a technique of the sol-gel type involving the decomposition of materials of organometallic type: an organic polymer of polyethylene glycol PEG type can then be introduced into the solution, in addition to the organometallic precursor(s): on curing the layer by heating, the PEG is burnt off, which brings about or accentuates a degree of porosity in the thickness of the layer.

The thickness of the coating according to the invention is variable; it is preferably between 5 nm and 1 micron, in particular between 5 and 100 nm, in particular between 10 and 80 nm, or between 20 and 50 nm. In fact, the choice of the thickness can depend on various parameters, in particular on the targeted application of the substrate of the glazing type or alternatively on the size of the $TiO_2$ crystallites in the coating or on the presence of a high proportion of alkali metals in the substrate.

It is possible to arrange, between the substrate and the coating according to the invention, one or a number of other thin layers with a different or complementary function to that of the coating. It can concern, in particular, layers with an anti-static, thermal or optical function or promoting the crystalline growth of $TiO_2$ in the anatase or rutile form or of layers forming a barrier to the migration of certain elements originating from the substrate, in particular forming a barrier to alkali metals and very particularly to sodium ions when the substrate is made of glass.

It is also possible to envisage a stack of alternating "antiglare" layers of thin layers with high and low indices, the coating according to the invention constituting the final layer of the stack. In this case, it is preferable for the coating to have a relatively low refractive index, which is the case when it is composed of a mixed oxide of titanium and of silicon.

The layer with an anti-static and/or thermal function (heating by providing it with power leads, low-emissive, anti-solar, and the like) can in particular be chosen based on a conductive material of the metal type, such as silver, or of the doped metal oxide type, such as indium oxide doped with tin ITO, tin oxide doped with a halogen of the fluorine type $SnO_2$:F or with antimony $SnO_2$:Sb or zinc oxide doped with indium ZnO:In, with fluorine ZnO:F, with aluminium ZnO:Al or with tin ZnO:Sn. It can also concern metal oxides which are stoichiometrically deficient in oxygen, such as $SnO_{2-x}$ or $ZnO_{2-x}$ with x<2.

The layer with an anti-static function preferably has a surface resistance value of 20 to 1000 ohms.square. Provision can be made for furnishing it with power leads in order to polarize it (feeding voltages for example of between 5 and 100 V). This controlled polarization makes it possible in particular to control the deposition of dust with a size of the order of a millimetre capable of being deposited on the coating, in particular dry dust which adheres only by an electrostatic effect: by suddenly reversing the polarization of the layer, this dust is "ejected".

The thin layer with an optical function can be chosen in order to decrease the light reflection and/or to render more neutral the colour in reflection of the substrate. In this case, it preferably exhibits a refractive index intermediate between that of the coating and that of the substrate and an appropriate optical thickness and can be composed of an oxide or of a mixture of oxides of the aluminium oxide $Al_2O_3$, tin oxide $SnO_2$, indium oxide $In_2O_3$ or silicon oxycarbide or oxynitride type. In order to obtain maximum attenuation of the colour in reflection, it is preferable for this thin layer to exhibit a refractive index close to the square root of the product of the squares of the refractive indices of the two materials which frame it, that is to say the substrate and the coating according to the invention. In the same way, it is advantageous to choose its optical thickness (that is to say the product of its geometric thickness and of its refractive index) similar to lambda/4, lambda being approximately the average wavelength in the visible, in particular from approximately 500 to 550 nm.

The thin layer with a barrier function with respect to alkali metals can be in particular chosen based on silicon oxide, nitride, oxynitride or oxycarbide, made of aluminium oxide containing fluorine $Al_2O_3$:F or alternatively made of aluminium nitride. In fact, it has proved to be useful when the substrate is made of glass, because the migration of sodium ions into the coating according to the invention can, under certain conditions, detrimentally affect the photocatalytic properties thereof.

The nature of the substrate or of the sublayer furthermore has an additional advantage: it can promote the crystallization of the photocatalytic layer which is deposited, in particular in the case of CVD deposition.

Thus, during deposition of $TiO_2$ by CVD, a crystalline $SnO_2$:F sublayer promotes the growth of $TiO_2$ mostly in the rutile form, in particular for deposition temperatures of the order of 400° to 500° C., whereas the surface of a soda-lime glass or of a silicon oxycarbide sublayer rather induces an anatase growth, in particular for deposition temperatures of the order of 400° to 600° C.

All these optional thin layers can, in a known way, be deposited by vacuum techniques of the cathodic sputtering type or by other techniques of the thermal decomposition type, such as solid, liquid or gas phase pyrolyses. Each of the abovementioned layers can combine a number of functions but it is also possible to superimpose them.

Another subject of the invention is "dirt-repellent" (organic and/or inorganic dirty marks) and/or "anti-condensation" glazing, whether it is monolithic or insulating multiple units of the double glazing or laminated type, which incorporates the coated substrates described above.

The invention is thus targeted at the manufacture of glass, ceramic or vitroceramic products and very particularly at the manufacture of "self-cleaning" glazing. The latter can advantageously be building glazing, such as double glazing (it is then possible to arrange the coating "external side" and/or "internal side", that is to say on face 1 and/or on face 4). This proves to be very particularly advantageous for glazing which is not very accessible to cleaning and/or which needs to be cleaned very frequently, such as roofing glazing, airport glazing, and the like. It can also relate to vehicle windows where maintenance of visibility is an essential safety criterion. This coating can thus be deposited on car windscreens, side windows or rear windows, in particular on the face of the windows turned towards the inside of the passenger compartment. This coating can then prevent the formation of condensation and/or remove traces of dirty finger mark, nicotine or organic material type, the organic material being of the volatile plasticizing type released by the plastic lining the interior of the passenger compartment, in particular that of the dashboard (release sometimes known under the term "fogging"). Other vehicles such as planes or trains can also find it advantageous to use windows furnished with the coating of the invention.

A number of other applications are possible, in particular for aquarium glass, shop windows, greenhouses, verandas, or glass used in interior furniture or street furniture but also mirrors, television screens, the spectacle field or any architectural material of the facing material, cladding material or roofing material type, such as tiles, and the like.

The invention thus makes it possible to functionalize these known products by conferring on them anti-ultraviolet, dirt-repellent, bactericidal, anti-glare, anti-static or antimicrobial properties and the like.

Another advantageous application of the coating according to the invention consists in combining it with an electrically controlled variable absorption glazing of the following types: electrochromic glazing, liquid crystal glazing, optionally with dichroic dye, glazing containing a system of suspended particles, viologen glazing and the like. As all these glazing types are generally composed of a plurality of transparent substrates, between which are arranged the "active" elements, it is then possible advantageously to arrange the coating on the external face of at least one of these substrates.

In particular in the case of an electrochromic glazing, when the latter is in the coloured state, its absorption results in a degree of surface heating which, in fact, is capable of accelerating the photocatalytic decomposition of the carbonaceous substances which are deposited on the coating according to the invention. For further details on the structure of an electrochromic glazing, reference will advantageously be made to Patent Application EP-A-0,575,207, which describes an electrochromic laminated double glazing, it being possible for the coating according to the invention preferably to be positioned on face 1.

Another subject of the invention is the various processes for obtaining the coating according to the invention. It is possible to use a deposition technique of the pyrolysis type which is advantageous because it in particular makes possible the continuous deposition of the coating directly on the float-glass strip when a glass substrate is used.

The pyrolysis can be carried out in the solid phase, from powder(s) of precursor(s) of the organometallic type.

The pyrolysis can be carried out in the liquid phase, from a solution comprising an organometallic titanium precursor of the titanium chelate and/or titanium alcoholate type. Such precursors are mixed with at least one other organometallic precursor. For further details on the nature of the titanium precursor or on the deposition conditions, reference will be made, for example, to Patents FR-2,310,977 and EP-0,465,309.

The pyrolysis can also be carried out in the vapour phase, which technique is also denoted under the term of CVD (Chemical Vapour Deposition), from at least one titanium precursor of the halide type, such as $TiCl_4$, or titanium alcoholate of the Ti tetraisopropylate type, $Ti(OiPr)_4$. The crystallization of the layer can additionally be controlled by the type of sublayer, as mentioned above.

It is also possible to deposit the coating by other techniques, in particular by techniques in combination with the "sol-gel". Various deposition methods are possible, such as "dipping", also known as "dip coating", or a deposition using a cell known as "cell coating". It can also concern a method of deposition by "spray coating" or by laminar coating, the latter technique being described in detail in Patent Application WO-94/01598. All these deposition methods in general use a solution comprising at least one organometallic precursor, in particular titanium of the alcoholate type, which is thermally decomposed after coating the substrate with the solution on one of its faces or on both its faces.

It can be advantageous, moreover, to deposit the coating, whatever the deposition technique envisaged, not in a single step but via at least two successive stages, which appears to promote the crystallization of titanium oxide throughout the thickness of the coating when a relatively thick coating is chosen.

Likewise, it is advantageous to subject the coating with a photocatalytic property, after deposition, to a heat treatment of the annealing type. A heat treatment is essential for a technique of the sol-gel or laminar coating type in order to decompose the organometallic precursor(s) to oxide, once the substrate has been coated, and to improve the resistance to abrasion, which is not the case when a pyrolysis technique is used, where the precursor decomposes as soon as it comes into contact with the substrate. In the first case, as in the second, however, a post-deposition heat treatment, once the $TiO_2$ has been formed, improves its degree of crystallization. The chosen treatment temperature can in addition make possible better control of the degree of crystallization and of the crystalline nature, anatase and/or rutile, of the oxide.

However, in the case of a substrate made of soda-lime glass, multiple and prolonged annealings can promote attenuation of the photocatalytic activity because of an excessive migration of the alkali metals from the substrate towards the photoreactive layer. The use of a barrier layer between the substrate, if it is made of standard glass, and the coating, or the choice of a substrate made of glass with an appropriate composition, or alternatively the choice of a soda-lime glass with a surface from which alkali metals have been eliminated make it possible to remove this risk.

Other advantageous details and characteristics of the invention emerge from the description below of non-limiting implementational examples, with the help of the following figures:

FIG. 1: a cross-section of a glass substrate provided with the coating according to the invention, FIG. 2: a diagram of a sol-gel deposition technique, by so-called "dip coating" the coating, FIG. 3: a diagram of a so-called "cell coating" deposition technique, FIG. 4: a diagram of a so-called "spray coating" deposition technique, FIG. 5: a diagram of a deposition technique by laminar coating.

As represented very diagrammatically in FIG. 1, all the following examples relate to the deposition of a so-called "dirt-repellent" coating 3, essentially based on titanium oxide, on a transparent substrate 1.

The substrate 1 is made of clear soda-lime-silica glass with a thickness of 4 mm and a length and width of 50 cm. It is obvious that the invention is not limited to this specific type of glass. The glass can in addition not be flat but bent.

Between the coating 3 and the substrate 1 is found a thin optional layer 2, either based on silicon oxycarbide, written as SiOC, for the purpose of constituting a barrier to the diffusion of the alkali metals and/or a layer which attenuates light reflection, or based on tin oxide doped with fluorine $SnO_2$:F, for the purpose of constituting an anti-static and/or low-emissive layer, even with a not very pronounced low-emissive effect, and/or a layer which attenuates the colour, in particular in reflection.

EXAMPLES 1 TO 3

Examples 1 to 3 relate to a coating 3 deposited using a liquid phase pyrolysis technique. The operation can be carried out continuously, by using a suitable distribution nozzle arranged transversely and above the float-glass strip at the outlet of the float-bath chamber proper. In this instance, the operation is carried out non-continuously, by using a moveable nozzle arranged opposite the substrate 1 already cut to the dimensions shown, which substrate is first heated in an oven to a temperature of 400 to 650° C. before progressing a constant speed past the nozzle spraying at an appropriate solution.

Example 1

In this example, there is no optional layer 2. The coating 3 is deposited using a solution comprising two organometallic titanium precursors, titanium diisopropoxide diacetylacetonate and titanium tetraoctylene-glycolate, dissolved in a mixture of two solvents, the latter being ethyl acetate and isopropanol.

It should be noted that it is also entirely possible to use other precursors of the same type, in particular other titanium chelates of the titanium acetylacetonate, titanium (methyl acetoacetato), titanium (ethyl acetoacetato) or alternatively titanium triethanolaminato or titanium diethanolaminato type.

As soon as the substrate 1 has reached the desired temperature in the oven, i.e. in particular approximately 500° C., the substrate progresses past the nozzle which sprays at room temperature, using compressed air, the mixture shown.

A $TiO_2$ layer with a thickness of approximately 90 nm is then obtained, it being possible for the thickness to be controlled by the rate of progression of the substrate 1 past the nozzle and/or the temperature of the said substrate. The layer is partially crystalline in the anatase form.

This layer exhibits excellent mechanical behaviour. Its resistance to abrasion tests is comparable with that obtained for the surface of the bare glass.

It can be bent and dip coated. It does not exhibit bloom: the scattered light transmission of the coated substrate is less than 0.6% (measured according to the $D_{65}$ illuminant at 560 nm).

Example 2

Example 1 is repeated but inserting, between the substrate 1 and coating 3, an $SnO_2$:F layer 2 with a thickness of 73 nm. This layer is obtained by powder pyrolysis from dibutyltin difluoride DBTF. It can also be obtained, in a known way, by pyrolysis in the liquid or vapour phase, as is for example described in Patent Application EP-A-0,648,196. In the vapour phase, it is possible in particular to use a mixture of monobutyltin trichloride and of a fluorinated precursor optionally in combination with a "mild" oxidant of the $H_2O$ type.

The index of the layer obtained is approximately 1.9. Its surface resistance is approximately 50 ohms.

In the preceding Example 1, the coated substrate 1, mounted as a double glazing so that the coating is on face 1 (with another substrate 1' which is non-coated but of the same nature and dimensions as the substrate 1 via a 12 mm layer of air), exerts a colour saturation value in reflection of 26% and a colour saturation value in transmission of 6.8%.

In this Example 2, the colour saturation in reflection (in the goldens) is only 3.6% and it is 1.1% in transmission.

Thus, the $SnO_2$:F sublayer makes it possible to confer, on the substrate, anti-static properties due to its electrical conductivity and it also has a favourable effect on the colorimetry of the substrate, by making its coloration markedly more "neutral", both in transmission and in reflection, which coloration is caused by the presence of the titanium oxide coating 3 exhibiting a relatively high refractive index. It is possible to polarize it by providing it with a suitable electrical supply, in order to limit the deposition of dust with a relatively large size, of the order of a millimetre.

In addition, this sublayer decreases the diffusion of alkali metals into the photocatalytic $TiO_2$ layer. The photocatalytic activity is thus improved.

Example 3

Example 2 is repeated but this time inserting, between substrate 1 and coating 3, a layer 2 based on silicon oxycarbide with an index of approximately 1.75 and a thickness of approximately 50 nm, which layer can be obtained by CVD from a mixture of $SiH_4$ and ethylene diluted in nitrogen, as described in Patent Application EP-A-0,518,755. This layer is particularly effective in preventing the tendency of alkali metals ($Na^+$, $K^+$) and of alkaline-earth metals ($Ca^{++}$) originating from the substrate 1 to diffuse towards the coating 3 and thus the photocatalytic activity is markedly improved. As it has, like $SnO_2$:F, a refractive index intermediate between that of the substrate (1.52) and of the coating 3 (approximately 2.30 to 2.35), it also makes it possible to reduce the intensity of the coloration of the substrate, both in reflection and in transmission, and overall to decrease the light reflection value $R_L$ of the said substrate.

The following Examples 4 to 7 relate to depositions by CVD.

EXAMPLES 4 TO 7

Example 4

This example relates to the deposition by CVD of the coating 3 directly on the substrate 1 using a standard nozzle, such as that represented in the above-mentioned Patent Application EP-A-0,518,755. Use is made, as precursors, either of an organometallic compound or of a metal halide. In this instance, titanium tetraisopropylate is chosen as organometallic compound, this compound being advantageous because of its high volatility and its large working temperature range, from 300 to 650° C. In this example, deposition is carried out at approximately 425° C. and the $TiO_2$ thickness is 15 nm.

Tetraethoxytitanium $Ti(O-Et)_4$ may also be suitable and, as halide, mention may be made of $TiCl_4$.

Example 5

It is carried out similarly to Example 4, except that, in this instance, the 15 nm $TiO_2$ layer is not deposited directly on the glass but on a 50 nm SiOC sublayer deposited as in Example 3.

Example 6

It is carried out as in Example 4, except that, in this instance, the thickness of the $TiO_2$ layer is 65 nm.

Example 7

It is carried out as in Example 5, except that, in this instance, the thickness of the $TiO_2$ layer is 60 nm.

From these Examples 4 to 7, it is found that the substrates thus coated exhibit good mechanical behaviour with respect to the abrasion tests. In particular, no delamination of the $TiO_2$ layer is observed.

Example 8

This example uses a technique in combination with the sol-gel using a deposition method by "dipping", also known as "dip coating", the principle of which emerges from FIG. 2: it consists in immersing the substrate 1 in the liquid solution 4 containing the appropriate precursor(s) of the coating 3 and in then withdrawing the substrate 1 therefrom at a controlled rate using a motor means 5, the choice of the rate of withdrawal making it possible to adjust the thickness of solution remaining at the surface of the two faces of the substrate and, in fact, the thickness of the coatings deposited, after heat treatment of the latter in order both to evaporate the solvent and to decompose the precursor or precursors to oxide.

Use is made, for depositing the coating 3, of a solution 4 comprising either titanium tetrabutoxide $Ti(O-Bu)_4$, stabilized with diethanolamine DEA in the molar proportion 1:1, in an ethanol-type solvent containing 0.2 mol of tetrabutoxide per litre of ethanol, or the mixture of precursors and of solvents described in Example 1. (Another precursor, such as titanium (diethanolaminato)dibutoxide, can also be used).

The substrates 1 can contain SiOC sublayers.

After withdrawal from each of the solutions 4, the substrates 1 are heated for 1 hour at 100° C. and then for approximately 3 hours at 550° C. with the temperature raised gradually.

A coating 3 is obtained on each of the faces, which coating is in both cases made of highly crystalline $TiO_2$ in the anatase form.

Example 9

This example uses the technique known as "cell coating", the principle of which is recalled in FIG. 3. It relates to forming a narrow cavity, delimited by two substantially parallel faces 6, 7 and two seals 8, 9, at least one of these faces 6, 7 consisting of the face of the substrate 1 to be treated. The cavity is then filled with the solution 4 of precursor(s) of the coating and the solution 4 is withdrawn in a controlled way, so as to form a wetting meniscus, for example using a peristaltic pump 10, leaving a film of the solution 4 on the face of the substrate 1 as this solution is withdrawn.

The cavity 5 is then maintained for at least the time necessary for drying. The film is cured by heat treatment. The advantage of this technique, in comparison with "dip coating", is in particular that it is possible to treat only a single one of the two faces of the substrate 1 and not both systematically, unless a masking system is resorted to.

The substrates 1 comprise thin layers 2 based on silicon oxycarbide SiOC.

Example 6 uses respectively the solutions 4 described in Example 8. The same heat treatments are then carried out in order to obtain the $TiO_2$ coating 3.

The coating 3 exhibits good mechanical durability.

Under an SEM (scanning electron microscope), a field effect appears in the form of "grains" of monocrystals with a diameter of approximately 30 nm. The roughness of this coating induces wetting properties which are enhanced with respect to a non-rough coating.

These same solutions 4 can also be used to deposit coatings by "spray coating", as represented in FIG. 4, where the solution 4 is sprayed in the form of a cloud against the substrate 1 statically, or by laminar coating, as represented in FIG. 5. In the latter case, the substrate 1, held by vacuum suction against a support 11 made of stainless steel and Teflon, is passed over a tank 12 containing the solution, in which solution is partially immersed a slotted cylinder 14, and the combined tank 12 and cylinder 14 are then moved over the whole length of the substrate 1, the mask 13 preventing excessive evaporation of the solvent from the solution 4. For further details regarding this latter technique, reference will advantageously be made to the abovementioned Patent Application WO-94/01598.

Tests were carried out on the substrates obtained according to the above examples in order to characterize the coatings deposited and to evaluate their "anti-condensation" and "dirt-repellent" behaviour.

Test 1: This is the test of the condensation aspects. It consists in observing the consequences of the photocatalysis and of the structure of the coating (level of hydroxyl groups, porosity, roughness) on the wetting. If the surface is photoreactive, the carbonaceous microcontaminants which are deposited on the coating are continually destroyed and the surface is hydrophilic and thus anti-condensation It is also possible to carry out a quantitative evaluation by suddenly reheating the initially coated substrate, stored in the cold or simply by blowing over the substrate, by measuring if condensation appears and, in the affirmative, at what time, and by then measuring the time necessary for the disappearance of the said condensation.

Test 2: It relates to the evaluation of the hydrophilicity and the oleophilicity at the surface of the coating 3, in comparison with those of the surface of a bare glass, by measurement of contact angles of a drop of water and of a drop of DOP (dioctyl phthalate) at their surfaces, after having left the substrates for one week in the surrounding atmosphere under natural light, in the dark and then having subjected them to UVA radiation for 20 minutes.

Test 3: It consists in depositing, on the substrate to be evaluated, a layer of an organosilane and in irradiating it with UVA radiation so as to degrade it by photocatalysis. As the organosilane modifies the wetting properties, measurements of contact angle of the substrate with water during the irradiation indicate the state of degradation of the grafted layer. The rate of disappearance of this layer is related to the photocatalytic activity of the substrate.

The grafted organosilane is a trichlorosilane: octadecyltrichlorosilane (OTS). The grafting is carried out by dipping.

The test device is composed of a turntable rotating around from 1 to 6 low pressure UVA lamps. The test specimens to be evaluated are placed in the turntable, the face to be evaluated on the side of the UVA radiation. Depending on their position and the number of lamps switched on, each test specimen receives a UVA irradiation varying from 0.5 $W/m^2$ to 50 $W/m^2$. For Examples 1, 2, 3, 8 and 9, the irradiation power is chosen as 1.8 $W/m^2$ and, for Examples 4 to 7, as 0.6 $W/m^2$.

The time between each measurement of the contact angle varies between 20 min and 3 h, depending on the photocatalytic activity of the test specimen under consideration. The measurements are carried out using a goniometer.

Before irradiation, the glasses exhibit an angle of approximately 100°. It is considered that the layer is destroyed after irradiation when the angle is less than 20°.

Each test specimen tested is characterized by the mean rate of disappearance of the layer, given in nanometres per hour, that is to say the thickness of the organosilane layer deposited divided by the irradiation time which makes it possible to reach a final stationary value of less than 20° (time for disappearance of the organosilane layer).

All the preceding examples pass Test 1, that is to say that, when the substrates coated with the coating are blown on, they remain perfectly transparent, whereas a highly visible layer of condensation is deposited on non-coated substrates.

The examples were subjected to Test 2: the coated substrates, after exposure to UVA radiation, exhibit a contact angle with water and with DOP of not more than 5°. In contrast, a bare glass under the same conditions exhibits a contact angle with water of 40° and a contact angle with DOP of 20°.

The results of the substrates coated according to the above examples in Test 3 are combined in the table below.

| Substrate | Test 3, of wetting, at 1.8 W/m² UVA (in nm/h) |
|---|---|
| Example 1 (TiO₂ on bare glass) | 0.03 |
| Example 2 (TiO₂ on SnO₂:F) | 0.1 |
| Example 3 (TiO₂ on SiOC) | 0.2 |
| Example 8 (TiO₂ on 50 nm SiOC) | 5 |
| Example 9 (TiO₂ on 50 nm SiOC) | 5 |
| Bare glass | 0 |

| Substrate (CVD) | Test 3, of wetting, at 0.6 W/m² UVA (in nm/h) |
|---|---|
| Example 4 (TiO₂ on bare glass) | <0.05 nm/h |
| Example 5 (TiO₂ on SiOC) | 4 |
| Example 6 (TiO₂ on bare glass) | 9 |
| Example 7 (TiO₂ on SiOC) | 19.5 |

From the table, it can be seen that the presence of sublayers, in particular of SiOC, promotes the photocatalytic activity of the coating containing the $TiO_2$, by its barrier effect to alkali metals and alkaline-earth metals which can migrate from the glass (comparison of Examples 4 and 5 or 6 and 7).

It is also observed that the thickness of the coating containing the $TiO_2$ also plays a role (comparison of Examples 1 and 3): for a $TiO_2$ coating with a thickness greater than the mean size of the monocrystals or "crystallites", a better photocatalytic effect is obtained.

Indeed, it could be observed that the $TiO_2$ coatings obtained by CVD exhibit the most advanced crystallization, with crystallite sizes of the order of 20 to 30 nm. It can be seen that the photocatalytic activity of Example 6 (65 nm of $TiO_2$) is markedly greater than that of Example 4 (15 nm of $TiO_2$ only). It is therefore advantageous to provide a $TiO_2$ coating thickness at least two times greater than the mean diameter of the crystallites which it contains. Alternatively, as in the case of Example 5, it is possible to retain a $TiO_2$ coating with a thin thickness but then to choose to use a sublayer of, an appropriate nature and with an appropriate thickness for promoting as far as possible the crystalline growth of $TiO_2$ from the "first" layer of crystallites.

It could be observed that the crystallization of the $TiO_2$ was somewhat less advanced for the coatings deposited by a technique other than CVD. Here again, however, everything is still a matter of compromise: a less advanced crystallization and an a priori lower photocatalytic activity can be "compensated for" by the use of a deposition process which is less expensive or less complex, for example. Moreover, the use of an appropriate sublayer or the doping of the $TiO_2$ can make it possible to improve the photocatalytic behaviour, if necessary.

It is also confirmed, from the comparison of Examples 2 and 3, that the nature of the sublayer influences the crystallization form and, in fact, the photocatalytic activity of the coating.

The invention claimed is:

1. A glass, ceramic or vitroceramic substrate coated with a layer of photocatalytic titanium oxide, and with a layer with thermal function between the substrate and the layer of photocatalytic titanium oxide, wherein the layer with a thermal function is a low emissive layer, comprising at least one selected from the group consisting of indium oxide doped with ITO, tin oxide doped with fluorine or antimony, and zinc oxide doped with indium, fluorine or aluminum.

2. The coated substrate of claim 1, further comprising a layer forming a barrier to alkali metals.

3. The coated substrate of claim 2, wherein the layer forming a barrier to alkali metals comprises silicon oxide, silicon nitride, silicon oxynitride, silicon oxycarbide, aluminum oxide containing fluorine or aluminum nitride.

4. The coated substrate of claim 1, wherein the layer forming a barrier to alkali metals comprises $Al_2O_3F$.

5. The coated substrate of claim 1, wherein the photocatalytic titanium oxide is crystalline.

6. The coated substrate of claim 1, wherein the photocatalytic titanium oxide is in the anatase form.

7. The coated substrate of claim 1, wherein the layer of photocatalytic titanium oxide has a thickness of 5 nm to 1 micron.

8. The coated substrate of claim 1, wherein the layer of photocatalytic titanium oxide has a thickness of 5 nm to 100 nm.

9. The coated substrate of claim 1, wherein the layer of photocatalytic titanium oxide has a thickness of 10 nm to 80 nm.

10. The coated substrate of claim 1, wherein the layer of photocatalytic titanium oxide has a thickness of 20 nm to 50 nm.

11. A glazing comprising the coated substrate of claim 1.

12. A double glazing comprising the coated substrate of claim 1.

13. A method of producing the coated substrate of claim 1, comprising coating the substrate with the and the layer with thermal function between the substrate and the layer of photocatalytic titanium oxide.

* * * * *

UNITED STATES PATENT AND TRADEMARK OFFICE
CERTIFICATE OF CORRECTION

| | | |
|---|---|---|
| PATENT NO. | : 7,892,661 B2 | Page 1 of 1 |
| APPLICATION NO. | : 12/177492 | |
| DATED | : February 22, 2011 | |
| INVENTOR(S) | : Philippe Boire et al. | |

It is certified that error appears in the above-identified patent and that said Letters Patent is hereby corrected as shown below:

On the title page, Item (30), the Foreign Application Priority Data is incorrect. Item (30) should read:

Item -- (30)        Foreign Application Priority Data

Sep. 15, 1995    (FR) ............................ 95 10839 --

Signed and Sealed this
Fifth Day of April, 2011

David J. Kappos
*Director of the United States Patent and Trademark Office*